T. P. DOANE.
Orange-Peeler.
No. 206,707.　　　　Patented Aug. 6, 1878.
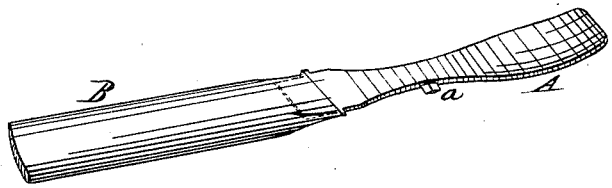
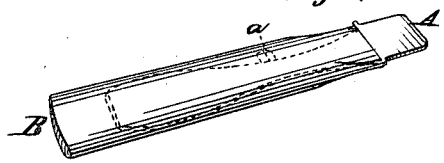
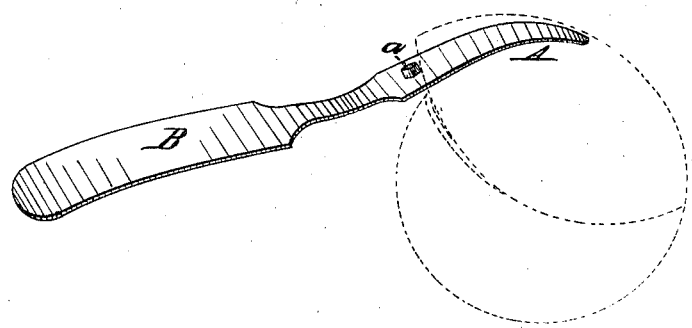

UNITED STATES PATENT OFFICE.

TRUMAN P. DOANE, OF NEW YORK, N. Y.

IMPROVEMENT IN ORANGE-PEELERS.

Specification forming part of Letters Patent No. 206,707, dated August 6, 1878; application filed January 31, 1878.

*To all whom it may concern:*

Be it known that I, TRUMAN P. DOANE, of New York city, county of New York, and State of New York, have invented certain new and useful Improvements in Orange-Peelers, of which the following is a full, clear, and exact description, reference being had to the accompanying drawings, and to the letters of reference marked thereon.

Figure 1 is a perspective view of my improved orange-peeler or fruit-knife, showing the blade inserted in the handle in a position ready for use. Fig. 2 is a similar view illustrating the device as it appears when the blade is entirely incased in the handle, the position of the blade being indicated by dotted lines, and the implement ready to be placed in the pocket. Fig. 3 is another perspective view, showing the method of using the improved device, and also a modified form of implement, the principles of construction being essentially the same, so far as removing the peel is concerned.

Like letters in all the figures indicate corresponding parts.

The object of my invention is primarily to produce a neat, simple, cheap, and convenient implement especially designed for removing the peel of oranges, but which may, of course, be used for any analogous purpose; and the invention consists, essentially, in combining a cutting prong or spur with a blade curved only in one direction, which form of blade adapts the part used in the operation of peeling to better effect its purpose, and also renders it more convenient to incase in a suitable hollow receptacle, which will serve as a handle, all of which will be hereinafter more fully described, and then pointed out in the claims.

A is the blade portion of the improved device, and this, as is plainly shown in the several figures, is curved in only one direction— that is to say, in any plane which, passed at right angles to the axis, would cut a straight line from the surface, but if passed in the direction of the axis would cut a gradually-curved line from said surface. This form being given the blade renders the device more serviceable or better adapts it to crowd off the peel from the orange, as indicated in Fig. 3.

Upon the side or top of the blade I locate the cutting prong or spur *a*, which is made about as long as ordinary orange-peelings are thick, which prong serves to make the initial cutting in the peel, it being prevented from cutting too deep by the surrounding portions of the blade.

B is the handle of the improved peeler, and it is desirable that this shall be made as flat and compact as possible. Into this handle the blade may be inserted, as shown in Fig. 1, when the implement is ready for use.

By simply reversing the blade and incasing it in the handle, as shown in Fig. 2, the implement is in convenient shape to be carried in the vest-pocket or elsewhere.

The blade being curved in one direction only, enables me to make the handle B flat, and further affords a resistance against the accidental displacement of the blade from the handle.

When the prong or spur *a* is placed upon the edge of the blade, as in Fig. 1, it does not bear against the interior of the casing B, and hence no difficulty can arise in its adoption, so far as the size of the casing is concerned. When the blade is made in the form shown in Fig. 3, the cutting prong or spur is located upon the top thereof, and a sufficient curvature given the blade, so that if a case be desired it will accommodate the prong, which would fall in the space between the two points of the blade which bear against the wall.

The blade in Fig. 3 is shown as made long enough to afford a handle in one piece with said blade, which form is advantageous in rendering the implement comparatively simple and rigid, but sacrifices the advantages in point of compactness afforded by the other form.

I propose to make the blade pointed, as indicated in Fig. 3, should circumstances warrant such construction, though I prefer the form shown in the other figures; and I also propose to make the edge of the blade sharp, in order that the one implement may be used for paring other fruits.

I am aware that an orange-peeler has before been constructed in which the blade was curved something in the shape of an ordinary spoon; and I am also aware that the addition of a cutting prong or spur to various styles of fruit-knives has before been known. To these features, broadly, I lay no claim; but,

Having thus fully described my invention, what I do claim as new, and desire to secure by Letters Patent, is—

1. The herein-described blade for an orange-peeler, the same being made of thin metal, curved only in the direction of its length, and provided with a cutting prong or spur upon its side or back, the whole adapted to be incased in a flat handle, as shown and described.

2. In combination with the blade A, curved only in the direction of its length, and provided with the cutting prong or spur $a$, the hollow handle B, serving to hold said blade in position for use, and adapted to confine it within the casing by pressure upon the curved portion, substantially as and for the purposes shown and described.

In testimony that I claim the foregoing I have hereunto set my hand in the presence of two witnesses.

TRUMAN P. DOANE. [L. S.]

Witnesses:
O. R. STANFORD,
I. A. HARRIS.